United States Patent [19]
McGuire

[11] 3,888,034
[45] June 10, 1975

[54] ADJUSTABLE FISHING POLE HOLDER
[76] Inventor: Kenneth H. McGuire, 5010 Sorento Rd., Sacramento, Calif. 95835
[22] Filed: Nov. 20, 1973
[21] Appl. No.: 417,518

[52] U.S. Cl. ................................................. 43/17
[51] Int. Cl. ........................................... A01k 97/12
[58] Field of Search ...................................... 43/17

[56] References Cited
UNITED STATES PATENTS

| | | |
|---|---|---|
| 2,464,309 | 3/1949 | Harshman ............................. 43/17 |
| 2,909,860 | 10/1959 | Braun ..................................... 43/17 |
| 3,470,647 | 10/1969 | Horner .................................... 43/17 |
| 3,560,969 | 2/1971 | Fleeman ............................. 43/17 X |
| 3,628,275 | 12/1971 | Howard ................................... 43/17 |

Primary Examiner—Louis G. Mancene
Assistant Examiner—Daniel J. Leach
Attorney, Agent, or Firm—Blair & Brown

[57] ABSTRACT

An adjustable fishing pole holder or tender that includes a sounding device such as a horn as well as a light unit so that when a fish strikes the line the sounding device will be actuated, and wherein the light can be used to indicate that the fish has engaged the hook as during night fishing. The holder comprises a stake for insertion in the ground, a tubular support hingedly secured to the stake for receiving a fishing pole, and a control unit mounted on the support including a pair of mercury switches within the control unit. The switches are connected in circuit to the sounding device and light and when the switches are tipped the circuit is closed to actuate the sounding device and light.

3 Claims, 5 Drawing Figures

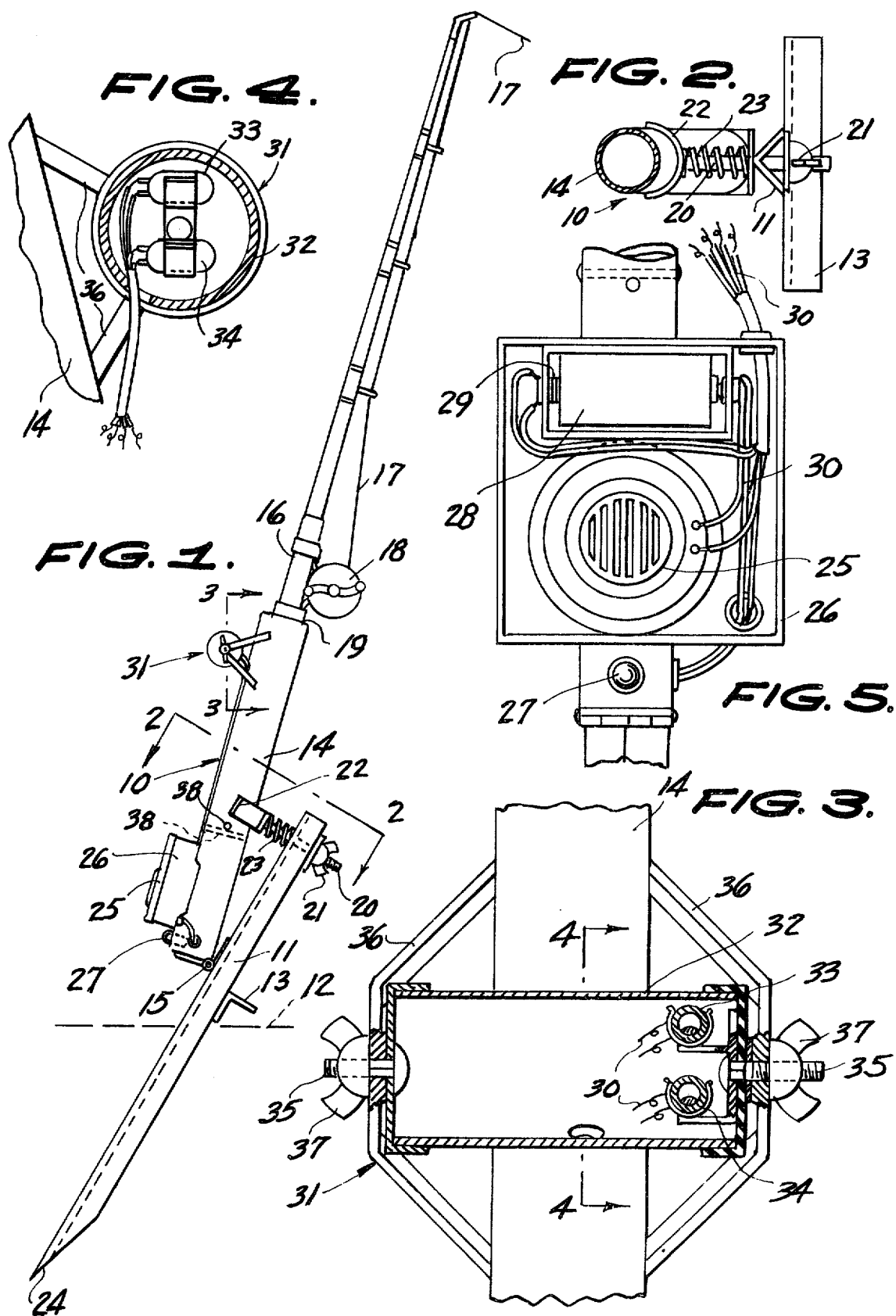

ADJUSTABLE FISHING POLE HOLDER

BACKGROUND OF THE INVENTION

FIELD OF THE INVENTION

The present invention relates to an adjustable fishing pole tender or holder.

SUMMARY OF THE INVENTION

An adjustable fishing pole holder or tender is provided wherein a conventional fishing pole or rod can be supported within the device so that in the event the device is actuated, a sounding device comprising a horn will be energized and in addition a light will be activated. Thus the device can be used for day or night fishing.

The primary object of the present invention is to provide an adjustable fishing pole holder that will serve to conveniently support the conventional fishing pole or rod in such a manner that the fisherman does not have to continually hold the rod or pole in his hands. Then, when a fish strikes the hook, the device will be actuated so that a sounding device, such as a horn, will be energized and a light will flash so that the fisherman will know to pull in the fish.

Still another object of the present invention is to provide an adjustable fishing pole holder or tender that is rugged in structure and simple and inexpensive to manufacture and foolproof in use.

Other objects and advantages will become apparent in the following specification when considered in light of the attached drawings.

BRIEF DESCRIPTION OF THE DRAWINGS

FIG. 1 is an elevational view illustrating the adjustable fishing hole holder of the present invention;

FIG. 2 is a sectional view, taken on the line 2—2 of FIG. 1;

FIG. 3 is a sectional view on an enlarged scale, taken on the line 3—3 of FIG. 1;

FIG. 4 is a sectional view, taken on the line 4—4 of FIG. 3; and

FIG. 5 is a view illustrating certain constructional details of the present invention.

DESCRIPTION OF THE PREFERRED EMBODIMENT

Referring now to the drawings in detail, wherein like reference characters indicate like parts throughout the several figures, the reference numeral 10 indicates generally an adjustable fishing pole holder or tender which includes a stake 11 that is adapted to be inserted in the ground 12 adjacent the body of water being fished. As shown in FIG. 1 the lower end of the stake 11 may be pointed as at 24 to facilitate insertion of the stake in the ground 12. The numeral 13 indicates a foot plate that can be engaged by the user's foot in order to facilitate the placement or insertion of the stake in the ground.

The device 10 of the present invention further includes a tubular support member 14 that has its lower end pivotally connected as of 15 to the stake 11. The support member 14 is adapted to receive the lower end or handle portion 19 of a conventional fishing rod or pole 16 as shown in FIG. 1. The fishing rod 16 is of the type that includes the usual fishing line 17, and may include other accessories such as a reel.

As shown in the drawings an adjustable support is provided which consists of a securing element or screw member 20 that extends through the upper end of the stake 11, and a fastener such as a wing nut 21 is arranged for threaded engagement with the securing element 20. The numeral 22 indicates a yoke or bracket that is affixed to the end of the securing element 20 for engaging a portion of the support member 14, and a coil spring or resilient means 23 is circumposed or mounted on the securing element 20.

The numeral 25 indicates a sounding device such as a horn that may be arranged in a suitable box-like member 26 that is affixed to the lower end of the support member 14, and light unit 27 is adapted to be connected to the support member 14 as shown in the drawings. The numeral 28 indicates a source of electrical energy such as a battery that may be mounted in a case 29, and there is provided an electrical circuit that includes the wires or conductors 30 for electrically connecting the parts together in the proper manner.

The numeral 31 indicates the control unit that is connected to the support member 14 and the control unit 31 includes a hollow housing 32 that has a pair of switches such as mercury switches 33, 34 therein, FIG. 3. Adjustable securing elements 35 are arranged as shown for coaction with the support pieces 36, and fasteners such as wing nuts 37 are adapted to be arranged in threaded engagement with the securing elements 35.

The numeral 38 indicates stop pins in the support member 14 that serve to prevent the fishing rod 16 from being inserted too far down in the support member 15.

From the foregoing, it will be seen that there has been provided an adjustable fishing pole tender or holder, and in use with the parts arranged as shown in the drawings, the stake 11 can be arranged in engagement with the ground 12 so that the fishing rod 16 can be conveniently supported. Then, when fish strike the line the horn 25 will be electrically actuated to advise the fisherman that a fish is on the line. Also, the light 27 will be actuated and the light 27 serves as a means of indicating to the fisherman that a fish is on the line for use in night fishing.

It is to be understood that the various parts can be adjusted to the desired positions or location. Also, the parts can be made of any suitable material or in different shapes and sizes as desired or required.

The tension of the spring 23 can be adjusted by means of the wing nut or fastener 21. Also, the control unit 31 can be adjusted by loosening the wing nuts 37 and then moving the parts to the desired position, and then tightening the wing nut 37 so that the parts can be maintained stationary in their adjusted position.

It is to be understood that the horn 25 signals when a fish strikes the bait, the light 27 flashes when night fishing.

The support member 14 is hingedly connected to the stake 11 as at 15. The pins or wires 38 are crossed to prevent the handle of the fishing pole from going too far into the tube member 14.

As shown in the drawings with further reference to the electric wires, two negative wires may be provided; one may lead to the back of the horn 25 and the other can lead to the negative side of the battery 28. Only one C battery need be used. The opposite ends of these wires may be connected to the respective mercury switch. A positive wire can be attached to the positive side of the battery 28 and the opposite end to the horn 25.

The horn is adapted to be insulated from the horn case or member 26 by a suitable element such as a plastic element and the plastic element may be large enough to cover the entire back of the horn or may be slightly larger in circumference then the horn itself. One of the switches 33 is adapted to be used for actuating the horn 25 while the other mercury switch 34 is adapted to be used for actuating the night light 27. The switch 33 can function as the horn switch, and the switch 34 is adapted to function as the light switch. In the use and operation of the invention with a fishing rod 16 positioned in the support 14 and the line 17 extending into the water with a baited fish hook thereon a fish strikes the bait and hook and pulls to try to free itself causing the rod 16 and support 14 to tip forwardly causing the mercury switches 33, 34 to tip and close circuits to the horn 25 and to the light 27 to thus signal the fisherman at night and day that a fish is on the line.

Having thus described the preferred embodiment of the invention it should be understood that numerous structural modifications and adaptations may be resorted to without departing from the spirit of the invention.

What is claimed is:

1. An adjustable fishing pole holder and signal comprising a stake for insertion in the earth, a tubular support hingedly secured to said stake and adapted to receive the lower end of a fishing pole, a securing element resiliently mounted on said stake and engaging said support for maintaining said support in a generally upright position, a control unit, means mounting said unit to said support for rotary adjustment about a generally horizontal axis transverse to said support, a pair of mercury switches mounted in said unit extending perpendicularly to the axis of said unit and spaced respectively above and below the axis of said unit, signal means on said support and means connecting said mercury switches to said signal means for actuating said signal means on movement of said support and said switches.

2. A device as claimed in claim 1 wherein said signal means comprises a sounding device and a light unit.

3. A device as claimed in claim 1 wherein said signal means comprises a horn actuated by one of said switches and a light actuated by the other of said switches.

* * * * *